United States Patent
Matsuda et al.

(10) Patent No.: US 6,197,367 B1
(45) Date of Patent: Mar. 6, 2001

(54) MAGNETIC RECORDING MEDIUM, METHOD OF FABRICATING MAGNETIC RECORDING MEDIUM, AND MAGNETIC STORAGE

(75) Inventors: Yoshibumi Matsuda, Odawara; Akira Ishikawa, Kodaira; Yotsuo Yahisa, Odawara; Yuzuru Hosoe, Hino; Tetsuya Kanbe, Yokohama; Koji Sakamoto, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/960,751

(22) Filed: Oct. 29, 1997

(30) Foreign Application Priority Data

Nov. 5, 1996 (JP) .................................. 8-292451

(51) Int. Cl.$^7$ ....................................... G11B 5/66
(52) U.S. Cl. ..................... 427/127; 427/128; 427/130; 427/131; 427/132; 204/192.2; 428/634 TS
(58) Field of Search ................. 428/634 TS; 204/192.2; 427/127, 128, 130–132

(56) References Cited

U.S. PATENT DOCUMENTS

| | | | |
|---|---|---|---|
| 4,552,820 | * 11/1985 | Lin | 428/611 |
| 4,900,397 | 2/1990 | Werner et al. | 216/22 |
| 5,316,631 | 5/1994 | Ando et al. | 204/192 |
| 5,344,706 | 9/1994 | Lambeth et al. | 428/336 |
| 5,456,978 | * 10/1995 | Lal | 428/332 |

FOREIGN PATENT DOCUMENTS

| | | |
|---|---|---|
| 0725391 | 8/1996 | (EP) . |
| 2-29923 | 1/1990 | (JP) . |
| 4-153910 | 5/1992 | (JP) . |
| 5-135343 | 6/1993 | (JP) . |
| 62-293511 | 12/1998 | (JP) . |

OTHER PUBLICATIONS

Yamanaka, K. et al., "Time dependence of remanence coercivity and medium noise in obliquely evaporated Co films," *Journal of Magnetism and Magnetic Materials*, 145 (1995), pp. 255–260.

Elliott, J. et al., Thermochemistry for Steelmaking, vol. I (1960), Addison–Wesley.

* cited by examiner

*Primary Examiner*—Leszek Kiliman
(74) *Attorney, Agent, or Firm*—Kenyon & Kenyon

(57) ABSTRACT

A magnetic recording medium having first undercoating layers 40, 40' formed directly or via substrate face undercoating layers on a substrate 40, second undercoating layers 42, 42' directly formed on the first undercoating layers 40, 40', magnetic films 43, 43' formed on the second undercoating layers 42, 42', and protective films 44, 44' formed on the magnetic films 43, 43'. Clusters having a large amount of oxygen are dispersed on the boundary face of the first and second undercoating layers. Preferably, the first undercoating layer is made of an alloy which includes two kinds of elements in which the difference between oxide formation standard free energies $\Delta G°$ of the elements at the temperature of 250° C. is large.

4 Claims, 7 Drawing Sheets

20nm

MAGNETIC RECORDING MEDIUM, METHOD OF FABRICATING MAGNETIC RECORDING MEDIUM, AND MAGNETIC STORAGE

BACKGROUND OF THE INVENTION

The present invention relates to a magnetic storage used for an auxiliary storage of a computer, or the like, a magnetic recording medium used for the magnetic storage, and a method of fabricating the magnetic recording medium.

With progress of information-oriented society, the amount of information daily used is steadily increasing. Demand for high density recording and large memory capacity for a magnetic storage is accordingly being stronger. An inductive head using voltage change in association with magnetic flux change with time is used as a conventional magnetic head. Both of recording and reproduction are performed by one head. In recent years, a composite head having a head for recording and a head for reproduction, in which an MR (magnetic resistive) head with higher sensitivity is used as the reproduction head, is rapidly increasingly used. In the MR head, change in electric resistance of a head device in association with change in magnetic flux leaked from a magnetic recording medium is used. A head with higher sensitivity using a very large magnetic resistive change (giant magnetic resistive effect or spin valve effect) which occurs in a plurality of magnetic layers laminated via non-magnetic layers is being developed. According to the head, change in electric resistance which is caused by change in relative directions of magnetization of the plurality of magnetic layers via the non-magnetic layers by the magnetic field leaked from a medium is used.

In magnetic recording media which are practically used at present, alloys containing Co as a main component, such as Co—Cr—Pt, Co—Cr—Ta, Co—Ni—Cr, and the like are used for a magnetic layer. Each of the Co alloys has a hexagonal close-packed (hcp) structure in which a c-axis direction is an easy axis of magnetization, so that a crystal orientation such that the c-axis of the Co alloy is the longitudinal direction, that is, (11.0) orientation is desirable as a longitudinal magnetic recording medium for reversing the magnetization in the magnetic layer and recording. The (11.0) orientation is, however, unstable, so that when the Co alloy is formed directly on a substrate, such an orientation is not generally obtained.

A method in which the fact that a Cr (100) plane having a body-centered cubic (bcc) structure has good lattice matching with a Co (11.0) plane is used, a (100) orientated Cr-undercoating layer is first formed on a substrate, and a Co alloy magnetic film is epitaxially grown, thereby obtaining the (11.0) orientation such that the c-axis of the Co alloy magnetic film is orientated to the in-plane direction. Also, a method in which a second element is added to Cr to improve the crystal lattice matching performance in the boundary face between the Co alloy magnetic film and the Cr undercoating layer and intervals of lattices in the Cr undercoating layer are widened is used. The Co (11.0) orientation is further improved and coercive force can be increased. There are examples of adding V, Ti, and the like.

Another factor necessary to realize high recording density is reduction in noises as well as increase in coercive force of the magnetic recording medium. Since the MR head has extremely high reproduction sensitivity, it is suitable for high density recording. However, the MR head is sensitive not only to reproduction signals from the magnetic recording medium but also to noises. Consequently, in the magnetic recording medium, it is requested to reduce noises more than a conventional technique. It is known that in order to reduce the medium noise, it is effective to fine and uniform the grain size of the magnetic film or the like.

As an importance request for the magnetic disk medium, improvement in shock resistance can be mentioned. Especially, a magnetic disk apparatus is mounted on a portable information device such as a notebook-sized personal computer or the like in recent years, so that improvement in the shock resistance is very important subject from the viewpoint of improving reliability. A glass substrate whose surface is strengthened or a crystallized glass substrate is used in place of a conventional Al alloy substrate to which Ni—P is plated on the surface, thereby enabling the shock resistance of the magnetic disk medium to be improved. Since the surface of the glass substrate is smoother than that of the conventional Ni—P plated Al alloy substrate, it is advantageous to reduce floating spacing between a magnetic head and the magnetic recording medium and is suitable to obtain high recording density. In case of using the glass substrate, however, problems of poor adhesion with the substrate, invasion of impurity ion from the substrate or absorption gas on the surface of the substrate into the Cr alloy undercoating layer, and the like occur. As a countermeasure, any of various metal films, alloy films, oxide films is formed between the glass substrate and the Cr alloy undercoating layer.

Japanese Patent Application Laid-Open Nos. 62-293511, 2-29923, 5-135343, and the like are techniques related to the above.

It is known that, as mentioned above, reducing and uniforming the grain size of the magnetic film is effective to reduce the medium noise. However, when a magnetic disk apparatus was produced experimentally by combining a magnetic recording medium with a recording density of about 900 megabits per square inch and a high-sensitive MR head according to the conventional technique, sufficient electromagnetic conversion characteristic by which 1 gigabit or higher recording density per square inch can be obtained could not be obtained. Especially, when the glass substrate was used as a substrate of the magnetic recording medium, poor electromagnetic conversion characteristic in a high recording density area was resulted. The cause was examined and it was found that the Cr alloy undercoating layer formed directly or via various metal or alloys as used in the conventional techniques on the glass substrate was not orientated as strong (100) as that in the case where it was formed on the Ni—P plated Al alloy substrate. A crystal plane except for (11.0) of the Co alloy magnetic film is grown in parallel to the substrate and the in-plane orientation of the c-axis as an easy axis of magnetization was small. Thus, the coercive force was reduced and a reproduction output with the high density recording deteriorated. In the case of using the glass substrate, the grain in the magnetic film was larger than that of the Al alloy substrate and the distribution of grains was larger by 20 to 30%. The medium noise was therefore increased and the electromagnetic conversion characteristic deteriorated. Even if an amorphous film or a fine crystal film disclosed in Japanese Patent Application Laid-Open No. 4-153910 was formed between the glass substrate and the undercoating layer, the size of the grain in the magnetic film was sometimes reduced to a certain degree but was not sufficiently reduced. It was not effective with respect to the reduction in the grain distribution, and preferable electromagnetic conversion characteristic could not be obtained.

SUMMARY OF THE INVENTION

It is a first object of the invention to provide a magnetic recording medium having low noise level in which orientation of a magnetic film is improved and the grains in the magnetic film are fined and uniformed.

It is a second object of the invention to provide a method of fabricating the magnetic recording medium.

It is a third object of the invention to provide a magnetic storage with high recording density.

In order to achieve the first object, according to a magnetic recording medium of the invention, a first undercoating layer is deposited directly or via a third undercoating layer on a substrate, a second undercoating layer is directly deposited on the first undercoating layer, and a magnetic film is deposited on the second undercoating layer. Clusters having a large amount of oxygen are spread on the boundary face of the first and second undercoating layers.

In order to achieve the second object, according to a method of fabricating a magnetic recording medium of the invention, a first undercoating layer is formed on a substrate directly or via a third undercoating layer and is exposed to an atmosphere including oxygen for a time period that $PO_2 \cdot t$ (where, $PO_2 \cdot t$ is oxygen partial pressure of the atmosphere and t is time of exposure of the substrate to the atmosphere) is in a range from $1 \times 10^{-6}$ (Torr·sec) to $1 \times 10^{-2}$ (Torr·sec), a second undercoating layer is directly formed on the first undercoating layer exposed to the atmosphere, and a magnetic film is formed on the second undercoating layer.

In order to achieve the third object, a magnetic storage of the invention comprises: the above-mentioned magnetic recording medium; a magnetic head constructed by a recording part and a reproducing part provided in correspondence to the faces of the magnetic recording medium; a drive unit for changing relative positions of the magnetic recording medium and the magnetic head; a magnetic head driving unit for positioning the magnetic head to a desired position; and a recording and reproduction signal processing system for inputting signals to the magnetic head and reproducing output signals form the magnetic head.

It is preferable that the first undercoating layer is made of an alloy consisting of two or more kinds of elements. In the case where elements which oxidize differently are included in the alloy and the first undercoating layer is exposed to an atmosphere at a certain oxygen partial pressure for a certain time, it is estimated as follows. A uniform oxide film whose surface is continuous in the plane is not formed but clusters having a large amount of oxygen are locally formed in an area rich in the element which is easily oxidized and become the nucleation of the second undercoating layer. The grains of the second undercoating layer grown on the clusters are fined and uniformed and further, the average gain size of the magnetic film is reduced and the grain diameter is uniformed.

The magnetic recording medium of the invention has effects on reduction in medium noise, increase in coercive force, and the like. According to the method of fabricating the magnetic recording medium of the invention, the above magnetic recording medium can be easily fabricated. The magnetic storage of the invention using the magnetic recording medium has high recording density.

Providing of oxidizing step in a process sequence of fabricating a magnetic disc is known by U.S. Pat. No. 4,552,820.

The purpose of oxidation in the invention is to reduce a modulation of reproduction output. The modulation is a kind of fluctuation in reproduction output due to anisotropy of crystal structure occurring in a sputtering apparatus of an in-line type (method of depositing films while conveying, that is, moving a substrate in one direction). Since a sputtering apparatus of a stationary facing type (method of depositing films while a substrate and a target stationarily face each other) is mainly used at present, the problem is ignored. Even in the sputtering apparatus of the in-line type, since a film thickness of an undercoating layer and that of a magnetic layer are reduced as the recording density becomes higher, the problem of the modulation is small. The present invention intends to reduce noise by uniforming the orientation of the crystal and is different from the above U.S. patent. According to the above U.S. patent, by oxidizing an Ni—V layer before depositing a Cr layer as an undercoating layer, the grain size of the Cr film is increased, thereby reducing the modulation. On the contrary, according to the present invention, clusters are generated by oxidization in a step prior to formation of the Cr alloy undercoating layer, and the grain size of the Cr alloy undercoating layer is reduced, thereby realizing reduction in noise.

The above and other objects and features of the present invention will become more apparent from the following detailed description of embodiments with reference to the accompanying drawings.

DETAILED DESCRIPTION OF THE PREFERRED EMBODIMENTS

Figure 1:
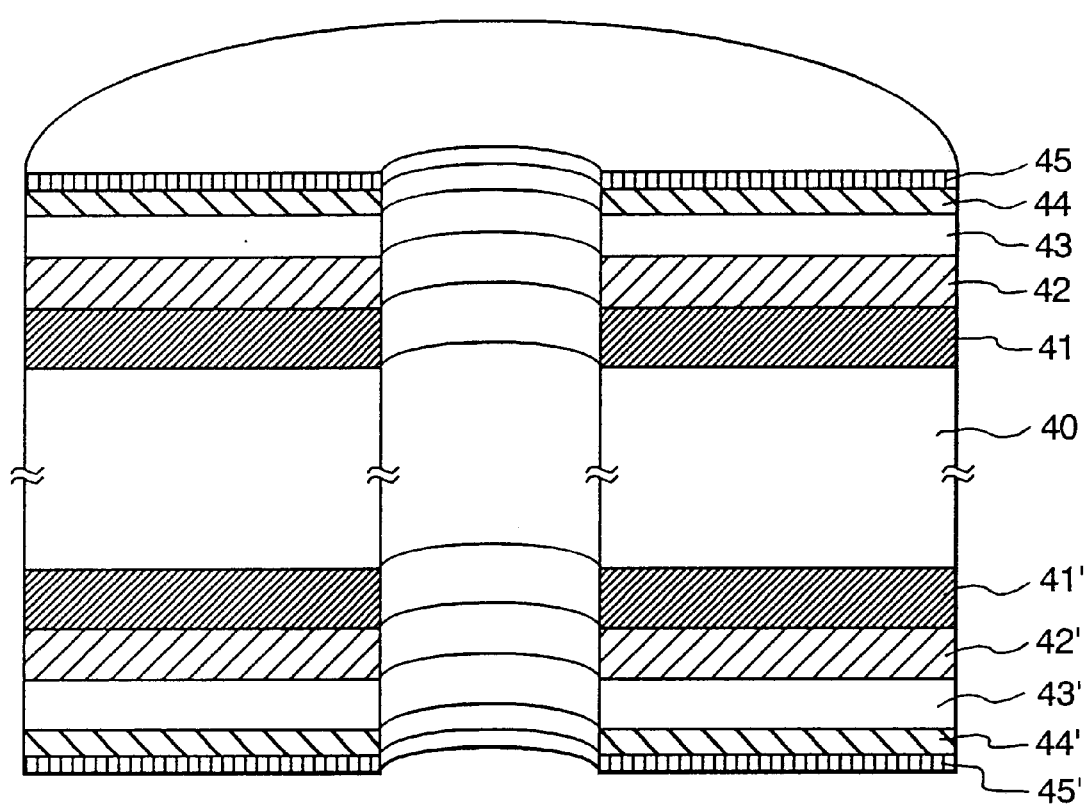
FIG. 1 is a schematic cross section of a magnetic recording medium according to an embodiment of the invention.

FIG. 1 is a schematical cross section of a representative embodiment of a magnetic recording medium according to the invention.

On both of the faces of a substrate 40 made of a strengthened glass, first undercoating layers 41, 41', second undercoating layers 42, 42', magnetic films 43, 43', protective films 44, 44', and lubricant films 45, 45' are sequentially laminated in this order, respectively.

Figure 2:
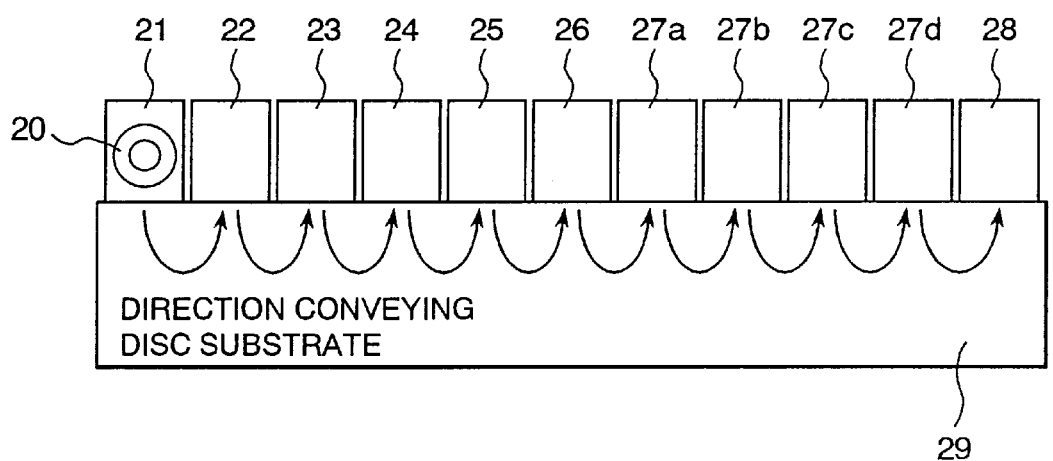
FIG. 2 is a schematic diagram showing an example of a layer forming device of a magnetic recording medium of the invention.

FIG. 2 is a schematic diagram showing an example of a sputtering apparatus of a single disc process type for fabricating the magnetic recording medium of FIG. 1. In the actual sputtering apparatus, a main chamber 29 is positioned in the center and a preparation chamber 21, a first undercoating layer forming chamber 22, a heating chamber 23, an oxidation chamber 24, a second undercoating layer forming chamber 25, a magnetic layer forming chamber 26, protective film forming chambers 27a, 27b, 27c, 27d, and a take-out chamber 28 are arranged in a circular shape around the main chamber 29. An operation for feeding the substrate after processing in a certain chamber to the next chamber is simultaneously performed with respect to the respective chambers. That is, a plurality of substrates can be simultaneously processed in the sputtering apparatus and the substrates can be sent sequentially to the chambers. Since it is preferable to form the protective film at low speed, the four protective film forming chambers 27a, 27b, 27c, and 27d are provided and ¼ of a desired thickness is formed in each chamber.

In the sputtering apparatus, the substrate 20 made of strengthened glass is first introduced to the preparation chamber 21 and the preparation chamber 21 is vacuumized, sequentially transferred to the chambers via the main chamber 29, and processed as follows. For example, an alloy of 60 at %Co-30 at %Cr-10 at %Zr is formed as a first undercoating layer at a room temperature and is heated to 270° C., and after that, it is exposed to a mixed gas of argon and oxygen in the oxidation chamber 24. At this time, the mixing ratio of the mixed gas and the time to expose to the atmosphere of the mixed gas are variably changed. The second undercoating layer made of, for example, an alloy of 75 at %Cr-15 at %Ti and the magnetic layer made of, for example, an alloy of 75 at %Co-19 at %Cr-6 at %Pt are sequentially laminated. During this period, the temperature is kept at or slightly lower than 270° C. Further, carbon having thickness of 10 to 30 nm is formed as the protective layer.

Figure 3:
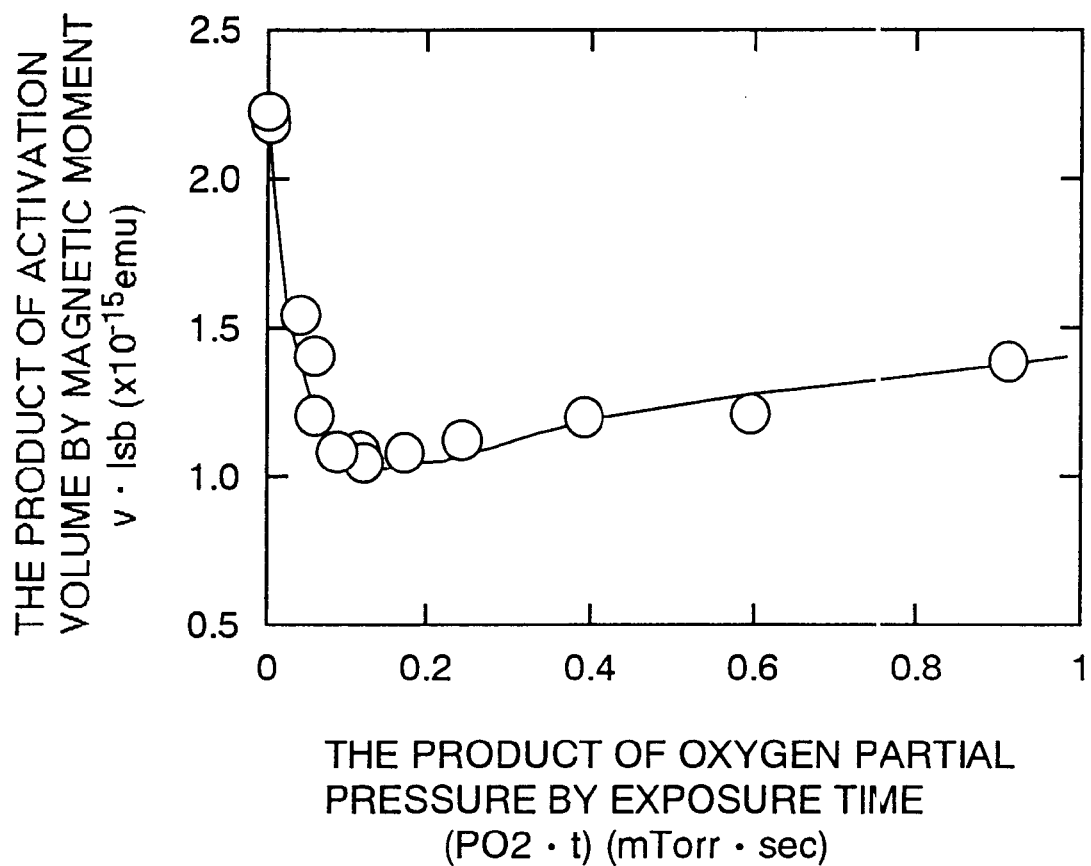
FIG. 3 is a diagram showing the relation of the product of activation volume and magnetic moment with respect to conditions at the time of forming a multi-undercoating layer of the magnetic recording medium of the invention.

When the mixing ratio of the mixed gas and the exposure time to the mixed gas were changed, it is found that, as shown in FIG. 3, the product (v·Isb) of the activation volume v and the magnetic moment Isb showing a linear correlation with medium noise was extremely small with respect to the product ($PO_2·t$) of oxygen partial pressure $PO_2$ of the atmosphere and exposure time t to the atmosphere. v·Isb is described in "Journal of Magnetism and Magnetic Materials", Vol. 145, pp. 255 to 260 (1995). v·Isb is a quantity corresponding to the minimum unit of the magnetization inversion and the smaller v·Isb is, the smaller the medium noise is. Since v·Isb is physical quantity, the medium noise can be objectively compared irrespective of the recording and reproducing conditions. $PO_2·t$ when v·Isb is the minimum varies according to the composite of an alloy of the first or second undercoating layer and the composition ratio. According to various experiments, when $PO_2·t$ ranges from $1\times10^{-6}$ (Torr·sec) to $1\times10^{-2}$ (Torr·sec), there was an effect on reduction of the medium noise. Especially, in the case where Co is included in the first undercoating layer, it was effective when $PO_2·t$ ranges from $1\times10^{-6}$ (Torr·sec) to $1\times10^{-3}$ (Torr·sec). That is, it was confirmed by using a TEM (transmission electron microscope) that the grain size of the second undercoating layer was reduced in the region of $PO_2·t$ where v·Isb is reduced.

Further, a lubricating film made of absorb perfluoroalkylpolyether or the like is deposited to a thickness on the order of 1 to 10 nm on the protective layer, thereby obtaining a reliable magnetic recording medium which can perform high density recording.

Similar effects can be derived when the heat treatment is performed before the formation of the first undercoating layers 41, 41'. It is also possible that the process is performed at a room temperature until the oxidation, then the temperature is increased to 270° C., and the second undercoating layer is formed. The heat treatment is a general method of improving the crystallinity of the undercoating layer, enhancing the coercive force of the magnetic film, and reducing the noise. Usually, the heat treatment is performed about at 200 to 300° C.

When a carbon film in which hydrogen is added, a film made of a compound of silicon carbide, tungsten carbide, or the like, or a composite film of the compound and carbon is used as each of the protective layers 44, 44', it is preferable since sliding resistance and corrosion resistance can be improved. After the protective layers are formed, when minute roughness is formed on the surface by performing plasma etching using a fine mask or the like, projections of different phases are formed on the surfaces of the protective layers by using a target of compound or mixture, or roughness is formed on the surface by heat treatment, contact area of the head and the medium can be reduced. It is preferable since a problem that the head is stuck to the medium surface at the time of a CSS (head contact start and stop) operation can be avoided.

In the case of using the Ni—P plated Al alloy substrate as the substrate 40 as well, in a manner similar to the case of using the glass substrate, the effect that the grains in the magnetic layer are fined was confirmed.

Figure 7:
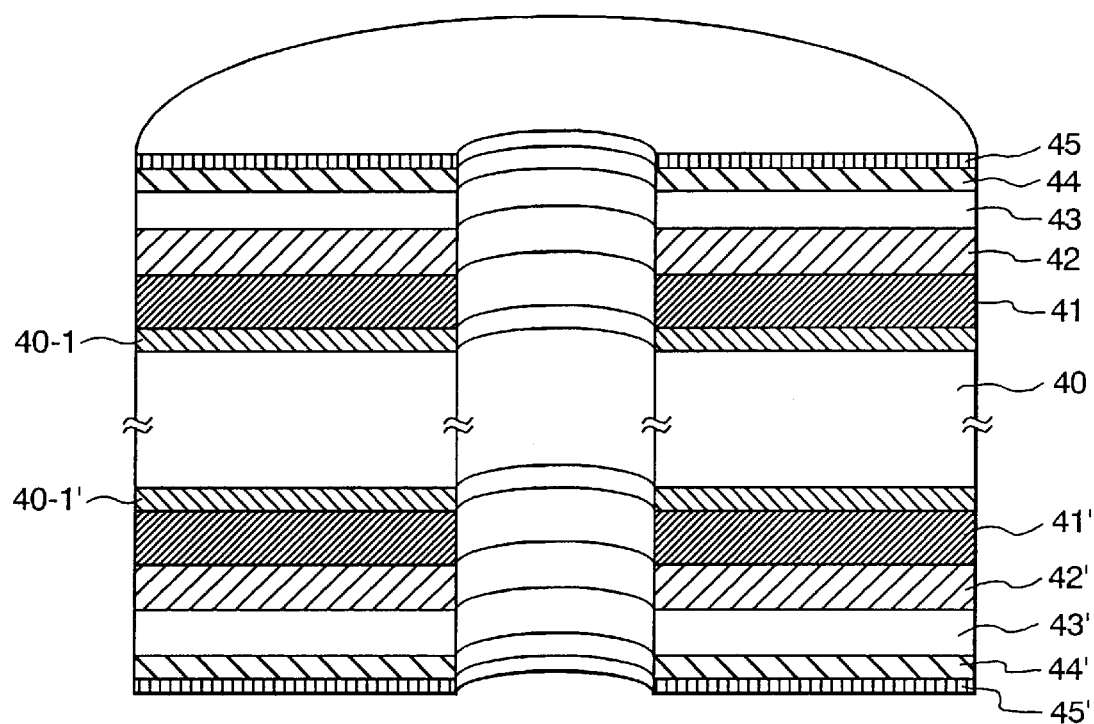
FIG. 7 is a schematic cross section of a magnetic recording medium according to another embodiment of the invention.

Further, in case of using the Al alloy substrate as the substrate 40, as shown in FIG. 7, it is preferable that substrate face undercoating layers 40-1, 40-1' made of Ni—P or the like are formed between the substrate 40 and the first undercoating layers 41, 41', respectively. Similarly, in case of using the glass substrate as the substrate 40 as well, it is preferable that the substrate face undercoating layers made of any of various metal layers, the alloy film, and the oxide film which are usually used are formed between the substrate 40 and the first undercoating layers 41, 41', respectively.

Figure 4:
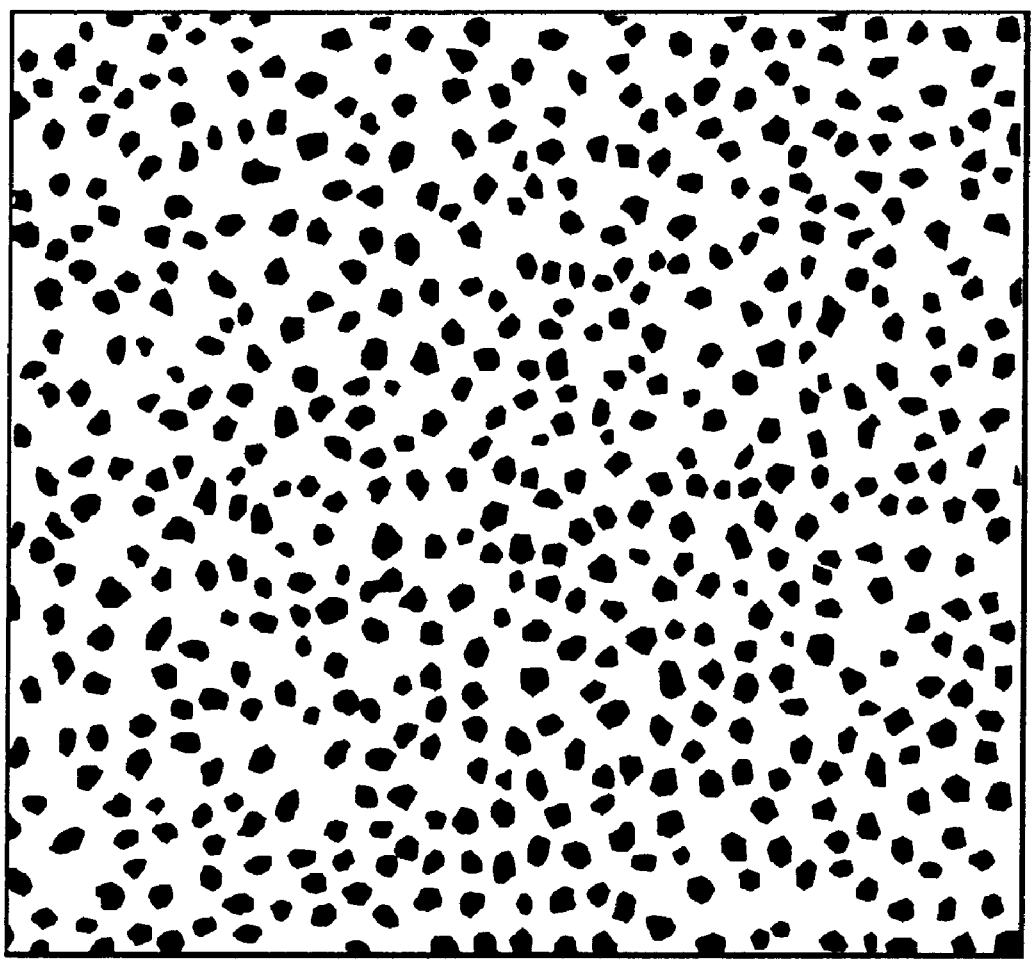
FIG. 4 is a schematic diagram of a TEM photograph of clusters formed on a first undercoating layer of the magnetic recording medium of the invention.

FIG. 4 is a schematic diagram illustrating clusters formed on each of the first undercoating layers 41, 41'. The diagram shows the structure of a sample of clusters formed on the substrate obtained by forming a single layer of 68 at %Co-24 at %Cr-8 at %W alloy as the first undercoating layer on the glass substrate when it is seen by using the transmission electron microscope (TEM). The clusters are minute grains as shown in FIG. 4 and are uniformly dispersed at intervals of few nm. Standard free energy for oxide formation is used as an index of the oxidizable degree of an element. It is preferable that an alloy forming the first undercoating layer includes two or more kinds of elements in which the difference of the oxide formation standard free energies $\Delta G°$ at the temperature of 250° C. is more than 150 (kJ/mol $O_2$) (in case of an element in which two or more kinds of oxides exist, (for example, Fe has oxides $Fe_2O_3$, $Fe_3O_4$, and the like), the lowest $\Delta G°$ is chosen). It is more preferable to include two or more kinds of elements in which the difference is 180 (kJ/mol $O_2$) or more. It is most preferable to include two or more kinds of elements in which the difference is 200 (kJ/mol $O_2$) or more. Although there is no upper limit of the difference, there are generally about 1000 combinations.

When an element whose oxide formation standard free energy $\Delta G°$ is −750 (kJ/mol $O_2$) or lower is included in the alloy, the effect can be derived with a supply of a small amount of oxygen. Table 1 shows various elements, corresponding oxides, and formation standard free energies $\Delta G°$ at the temperature of 250° C. $\Delta G°$ is a value read from the diagram of the relation between $\Delta G°$ and the temperature shown by Coughlin. This is shown in "Refining of nonferrous metals" (new system metal new edition refining metal version), The Japan Institute of Metals Publisher, 1964, pp.291 to 292.

TABLE 1

| Element | Oxide | Element oxide standard free energy for oxide formation ΔG° (kJ/molO₂) |
| --- | --- | --- |
| Co | CoO | −398 |
| Mo | MoO₃ | −410 |
| W | WO₃ | −473 |
| Cr | Cr₂O₃ | −666 |
| Ta | Ta₂O₅ | −724 |
| V | V₂O₃ | −737 |
| Si | SiO₂ | −783 |
| Ti | TiO | −933 |
| Zr | ZrO₂ | −992 |
| Al | Al₂O₃ | −1005 |

As an alloy used for the first undercoating layer, an alloy including Cr and at least one kind of element selected from a group of Mo, Ti, Zr and Al is preferable from the viewpoint of adhering performance to the substrate. Further, when an alloy containing Co and at least one kind of element selected from a group of Cr, Si, V, Ta, Ti, Zr, Al, and W is used as an alloy for the first undercoating layer, the alloy easily becomes amorphous or fine crystal and the texture becomes dense. It is consequently effective when the glass substrate is used since the alloy serves as a diffusing barrier against impurities such as alkali element or the like entering from the glass into the layer. Further, it is also effective to use an alloy containing Ni and at least one kind of element selected from a group of Cr, Si, V, Ta, Ti, Zr, Al, and W for the first undercoating layer, since the alloy easily becomes amorphous or fine crystal. "Amorphous" denotes that a clear peak by the X-ray diffraction is not observed or that a clear diffraction spot and a diffraction ring by the electron beam diffraction are not observed and a halo-shaped diffraction ring is observed. The fine crystal is constructed by crystal grains each having the size smaller than that of the grain size of the magnetic layer and, preferably, having the average diameter of 8 nm or smaller. Since the percentage content of an element having the smallest standard free energy ΔG° for oxide formation among the alloys used for the first undercoating layer is related to the number of nucleation, the percentage content of about 5 at % to 50 at % is preferable since it is effective on reduction of the grain size of the second undercoating layer. It is more preferable that it ranges from 5 at % to 30 at %.

Third undercoating layers can be also arranged between the first undercoating layers 41, 41' and the substrate 40. For example, the glass substrate is used as the substrate 40, various metal layers, alloy layers, oxide layers, or the like shown in the conventional technique can be used as the third undercoating layers.

For the second undercoating layers 42, 42', it is preferable to use an alloy having the bcc structure such as the Cr alloy having good lattice matching with the Co alloy magnetic layer. For example, Cr, and Cr alloys, that is, CrTi, CrV, CrMo, and the like can be used.

It is preferable that the thickness of the first undercoating layer ranges from 20 to 50 nm and that the thickness of the second undercoating layer ranges from 10 to 50 nm.

Preferably, as the magnetic layers 43, 43', magnetic layers in which magnetic anisotropy is oriented toward the in-plane is used. For such a magnetic layer, alloys containing Co as a main component, for example, Co—Cr—Pt, Co—Cr—Pt—Ta, Co—Cr—Pt—Ti, Co—Cr—Ta, Co—Ni—Cr, and the like can be used. However, in order to obtain higher coercive force, it is preferable to use the Co alloy including Pt. Further, the magnetic layer can be also constructed by a plurality of layers in which non-magnetic interlayers are included.

As magnetic characteristics of the magnetic layer, it is preferable that the coercive force measured by applying the magnetic field toward the inside of the film plane is set to 1.8 kilo oersted or more and the product Br·t of a residual magnetic flux density Br measured by applying the magnetic field to the inside of the film plane and the film thickness t ranging from 20 to 140 gauss micron, preferable recording and reproducing characteristics can be obtained in an area of a recording density of 1 giga bit per one square inch. If the coercive force is less than 1.8 kilo oersted, it is not preferable since an output at the time of high recording density (200 kFCI or higher) is reduced. FCI (flux reversal per inch) denotes a unit of recording density. When Br·t is larger than 140 gauss micron, the reproduction output at the time of the high recording density is reduced and when it is less than 20 gauss micron, it is not preferable that the reproduction output at the time of the low recording density is small.

When the magnetic film is constructed by a plurality of layers having non-magnetic interlayers, the film thickness t of the magnetic film in the calculation of Br·t shows the total of the thickness of the magnetic layers.

<Embodiment 1>

In the first embodiment, chemically strengthened soda-lime glass of 2.5 inches is used for the substrate 40. The first undercoating layers 41, 41' made of an alloy of 60 at %Co-30 at %Cr-10 at %Zr each having the thickness of 25 nm, the second undercoating layers 42, made of a 85 at %Cr-15 at %Ti alloy each having the thickness of 20 nm, the magnetic films 43, 43' made of a 75 at %Co-19 at %Cr-6 at %Pt alloy each having the thickness of 20 nm, and further the carbon protective layers 44, 44' each having the thickness of 10 nm are sequentially formed on the faces of the substrate 40, respectively. Single disc processing type sputtering apparatus mdp 250A manufactured by Intevac, Inc. is used as a layer forming apparatus and the layers are formed in 10 seconds per tact. Tact denotes a period of time during which the substrate is sent from a previous chamber to a certain chamber, processed in the chamber, and sent to a next chamber in the sputtering apparatus. The chamber construction of the sputtering apparatus is as shown in FIG. 2. Argon (Ar) gas pressure at the time of depositing the films is fixed to 6 mTorr. The oxygen partial pressure in the main chamber 29 during the layer forming operation is about $1 \times 10^{-8}$ (Torr).

The first undercoating layers 41, 41' are deposited in the first undercoating layer forming chamber 22 in a state where the substrate 4 is not heated, heated to 270° C. by a lamp heater in the heating chamber 23, and exposed to an atmosphere in which a pressure of 99%Ar-1%O₂ mixed gas is 5 mTorr (gas flow rate of 10 sccm) for three seconds in the oxidation chamber 24, and the layers are sequentially deposited on the processed first undercoating layers 41, 41' in the second undercoating layer forming chamber 25, the magnetic layer forming chamber 26, and the protective film forming chambers 27a, 27b, 27c, and 27d. PO₂·t in this case corresponds to 5 mTorr×0.01×3 seconds=$1.5 \times 10^{-4}$ (Torr·sec). After forming the carbon protective films, a material obtained by diluting a perfluoroalkylpolether material with a fluorocarbon material is applied as the lubricant films 45, 45'.

COMPARISON EXAMPLE 1

Comparison example 1 relates to a magnetic recording medium fabricated under the same conditions as the embodiment 1 except that the mixed gas is not introduced into the oxidation chamber 24.

The coercive force of the magnetic recording medium of the embodiment 1 was 2,170 oersted which is higher than that of the magnetic recording medium of the comparison example 1 by about 300 oersted. The product Br·t of the residual magnetic flux density Br and the magnetic film thickness t of the embodiment 1 was 89 gauss micron. v·Isb of the magnetic recording medium of the embodiment 1 was $1.05 \times 10^{-15}$ (emu) which is reduced to 47% of $2.24 \times 10^{-15}$ (emu) of the magnetic recording medium of the comparison example 1, so that the medium noise was reduced to almost the half of that of the comparison example 1. The reproduction outputs in the evaluated recording density region of the embodiment 1 and the comparison example 1 were almost the same. The S/N ratio of the medium was improved by an amount corresponding to the reduction of the medium noise.

When the magnetic recording media of the embodiment 1 and the comparison example 1 were actually inserted into a magnetic disk apparatus and recording and reproduction characteristics by an MR head were evaluated under that conditions of the track recording density of 161 kBPI (bit per inch) and the track density of 9.3 kTPI (track per inch). The magnetic recording medium of the embodiment 1 has an S/N ratio higher than that of the comparison example by 1.8 times and sufficiently satisfied the apparatus specification of 1.6 gigabits per square inch of the plane recording density. On the other hand, the medium of the comparison example 1 had an insufficient S/N ratio and could not satisfy the apparatus specification.

The first undercoating layer made of Co—Cr—Zr alloy is deposited so as to have thickness of 25 nm on the glass substrate and is processed in the oxidation chamber under the same conditions as those in the embodiment 1. When the structure of the Co—Cr—Zr alloy film was examined by using the TEM (transmission electron microscope), shading reflecting minute clusters corresponding to local oxidation on the surface of the first undercoating layer was observed in a TEM image. The diameter of each cluster is a few nm and the clusters are almost uniformly formed at pitches of a few nm. The TEM image is schematically shown in FIG. 4.

Figure 5:
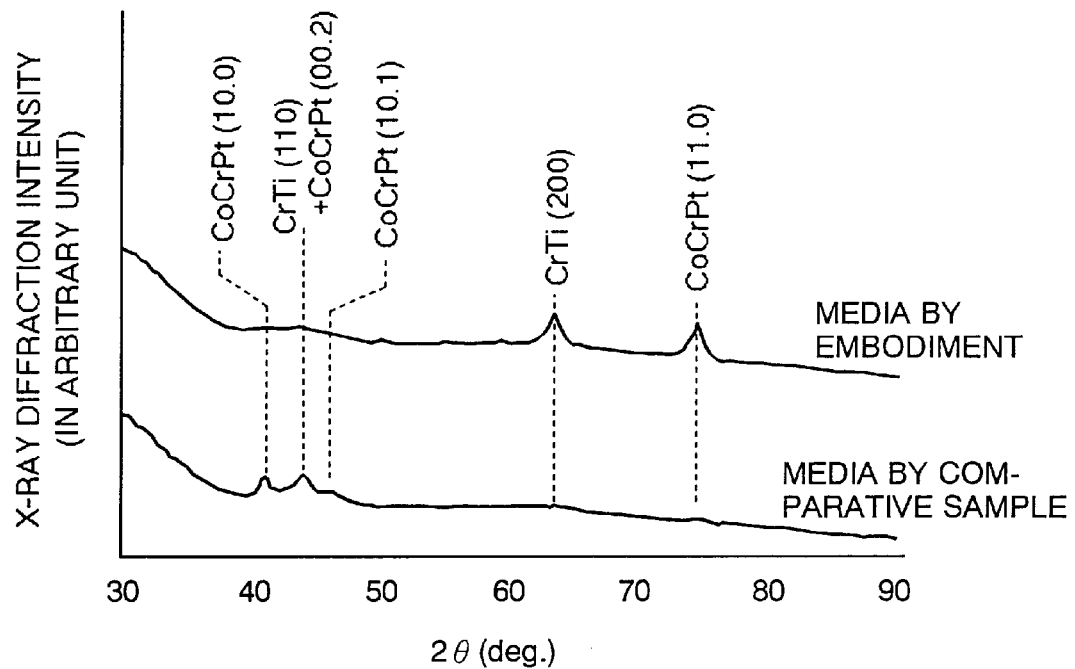
FIG. 5 is a diagram showing X-ray diffraction patterns of a magnetic recording medium according to an embodiment of the invention and a magnetic recording medium according to a comparison example.

When the X-ray diffractions of the magnetic recording media of the embodiment 1 and the comparison example 1 were measured, the diffraction patterns shown in FIG. 5 were obtained. When a single first undercoating layer of Co—Cr—Zr alloy is formed so as to have the thickness of 50 nm on the glass substrate under the same conditions and the X-ray diffraction was measured, a clear diffraction peak was not seen. In the diffraction pattern of the magnetic recording medium of the comparison example 1, the CrTi (110) peak of the body-centered cubic (bcc) structure of the second undercoating layer overlaps with the CoCrPt (00.2) peak of the hexagonal close-packed (hcp) structure of the magnetic film and both of them cannot be identified. However, in any case, the second undercoating layer is not so strongly (100) oriented as the first magnetic recording medium of the embodiment 1 and has mixed phases of a plurality of crystal grains having different orientations. Consequently, in the Co—Cr—Pt alloy crystal in the magnetic film, crystals are variably oriented and a plurality of diffraction peaks are seen in the Co—Cr—Pt magnetic film.

On the other hand, in the magnetic recording medium of the embodiment 1, since no diffraction peak is shown in the Co—Cr—Zr alloy single layer of the first undercoating layer as mentioned above, the diffraction peaks in the diagram are the CrTi (200) peak of the bcc structure of the second undercoating layer and the CoCrPt (11.0) peak of the hcp structure of the Co—Cr—Pt magnetic film. It is understood from the above that the Cr—Ti alloy of the second undercoating layer formed on the amorphous structured Co—Cr—Zr alloy layer has (100) orientation and the Co—Cr—Pt magnetic film on the second undercoating layer has (11.0) orientation by the epixial growth. The components of the in-plane direction of the c-axis as an easy axis of magnetization of the Co—Cr—Pt alloy are enlarged and the preferable magnetic characteristics can be obtained.

When the magnetic film was observed by using the TEM, the average grain size of the Co—Cr—Pt alloy of the embodiment 1 was 10.8 nm which is finer than 16.2 nm of that of the comparison example 1. When the magnetization of the Co—Cr—Zr alloy single layer was measured, a clear hysteresis curve was not obtained. Consequently, it can be considered that the alloy layer is non-magnetic.

<Embodiment 2>

A magnetic recording medium with a film construction similar to that of the embodiment 1 was fabricated. A chemically strengthened aluminosilicate glass of the 2.5 inch type was used as the substrate 40. The first undercoating layers made of 62 at %Co-30 at %Cr-8 at %Ta alloy each having the thickness of 40 nm were formed on the faces of the substrate. The second undercoating layers made of 80 at %Cr-20 at %Ti alloy each having the thickness of 25 nm, the magnetic films made of 72 at %Co-18 at %Cr-2 at %Ta-8 at %Pt alloy each having the thickness of 23 nm, and the carbon protective layers each having the thickness of 10 nm were sequentially formed. The same single disc process type sputtering apparatus as that of the embodiment 1 was used as a layer forming apparatus and layers were formed in 9 seconds per tact. The argon (Ar) gas pressure at the time of layer formation was fixed to 6 mTorr. The oxygen partial pressure in the main chamber during the layer forming operation was about $5 \times 10^{-9}$ (Torr).

The first undercoating layers were deposited in the first undercoating layer forming chamber in a state where the substrate was not heated, heated to 250° C. by a lamp heater in the heating chamber, and exposed to an atmosphere in which 98 mol %Ar-2 mol %O₂ mixed gas was used and the gas pressure was 4 mTorr (gas flow rate of 8 sccm) for three seconds in the oxidation chamber, and the layers were sequentially deposited. PO₂·t in this instance corresponds to 4 mTorr×0.02×3 seconds=$2.4 \times 10^{-4}$ (Torr·sec). After forming the carbon protective films, the lubricant films similar to those of the embodiment 1 were applied.

COMPARISON EXAMPLE 2

Comparison example 2 relates to a magnetic recording medium fabricated under the same conditions as the embodiment 2 except that the mixed gas was not introduced in the oxidation chamber.

The coercive force of the magnetic recording medium of the embodiment 2 was 2,640 oersted which is higher than that of the magnetic recording medium of the comparison example 2 by about 200 oersted. The product Br·t of the residual magnetic flux density Br and the magnetic film thickness t was 85 gauss micron. v·Isb of the magnetic recording medium of the embodiment 2 was $0.98 \times 10^{-15}$ (emu) which was reduced to 54% of $1.81 \times 10^{-15}$ (emu) of the magnetic recording medium of the comparison example 2, so that the medium noise was reduced to almost the half of that of the comparison example 2. The reproduction outputs in the evaluated recording density region of the embodiment 2 and the comparison example 2 were almost the same. The S/N ratio of the magnetic recording medium was improved by an amount corresponding to the reduction in the medium noise. When the magnetic recording media of the embodiment 2 and the comparison example 2 were actually inserted into a magnetic disk apparatus and recording and reproduction characteristics by an MR head were evaluated under that conditions of the track recording density of 210 kBPI and the track density of 9.6 kTPI. The magnetic recording medium of the embodiment 2 has an S/N ratio higher than that of the comparison example 2 by 1.3 times and sufficiently satisfied the apparatus specification of 2.0 gigabits per square inch of the plane recording density. On the other hand, the magnetic recording medium of the comparison example 2 had an insufficient S/N ratio and could not satisfy the apparatus specification.

<Embodiment 3>

A magnetic recording medium with a film construction similar to that of the embodiment 1 was fabricated. A chemically strengthened aluminosilicate glass of 2.5 inch type was used as the substrate 40. The first undercoating layers made of 85 at %Cr-15 at %Zr alloy having the thickness of 30 nm were formed on the faces of the substrate. The second undercoating layers made of 80 at %Cr-15 at %Ti-5 at %B alloy each having the thickness of 25 nm, the alloy magnetic film made of 72 at %Co-19 at %Cr-1 at %Ti-8 at %Pt each having the thickness of 22 nm, and the carbon protective layers each having the thickness of 10 nm were sequentially formed. The same single disc process type sputtering apparatus as that of the embodiment 1 was used as a layer forming apparatus and layers were formed in 8 seconds per tact. The argon (Ar) gauss pressure at the time of layer formation was fixed to 5 mTorr. The oxygen partial pressure in the main chamber during the layer forming operation was about $3 \times 10^{-9}$ (Torr).

The first undercoating layers were deposited in the first undercoating layer forming chamber in a state where the substrate was not heated, heated to 240° C. by a lamp heater in the heating chamber, and exposed to an atmosphere in which 79 mol %Ar-21 mol %$O_2$ mixed gas was used and the pressure of the mixed gas was 3 mTorr (gas flow rate of 6 sccm) for two seconds in the oxidation chamber, and the layers are sequentially deposited. $PO_2 \cdot t$ in this instance corresponds to 3 mTorr$\times 0.21 \times 2$ seconds$=1.3 \times 10^{-4}$ (Torr·sec). After forming the carbon protective films, the lubricant films similar to those of the embodiment 1 were applied.

COMPARISON EXAMPLE 3

Comparison example 3 relates to a magnetic recording medium fabricated under the same conditions as the embodiment 3 except that the mixed gas was not introduced into the oxidation chamber.

The coercive force of the magnetic recording medium of the embodiment 3 was 2,680 oersted which is higher than that of the magnetic recording medium of the comparison example 3 by about 200 oersted. The product Br·t of the residual magnetic flux density Br and the magnetic film thickness t was 69 gauss micron. v·Isb of the magnetic recording medium of the embodiment 3 was $0.89 \times 10^{-15}$ (emu) which is reduced to 60% of $1.44 \times 10^{-15}$ (emu) of the magnetic recording medium of the comparison example 3, so that the medium noise was reduced by almost 40% of that of the comparison example 3. The reproduction outputs of the evaluated recording density region of the embodiment 3 and the comparison example 3 were almost the same. The S/N ratio of the medium was improved by an amount corresponding to the reduction in the medium noise. When the magnetic recording media of the embodiment 3 and the comparison example 3 were actually inserted into a magnetic disk apparatus and recording and reproduction characteristics by an MR head were evaluated under that conditions of the track recording density of 225 kBPI and the track density of 9.8 kTPI, the magnetic recording medium of the embodiment 3 had an S/N ratio higher than that of the comparison example 3 by 1.4 times and sufficiently satisfied the apparatus specification of 2.2 gigabits per square inch of the plane track density. On the other hand, the medium of the comparison example 3 had an insufficient S/N ratio and could not satisfy the apparatus specification.

<Embodiment 4>

A magnetic recording medium with a film construction similar to that of the embodiment 1 was fabricated. Coating layers of 88 wt %Ni-12 wt %P were deposited to the thickness of 13 μm on both faces of the substrate made of 96 wt %Al-4 wt %Mg having the outer diameter of 95 mm, the inner diameter of 25 mm, and the thickness of 0.8 mm. The surface of the substrate was polished by a lapping machine so that the surface center line average roughness Ra was 2 nm, and is washed and dried. After that, by pressing an abrasive tape against the both of disk faces through a contact roll under the existence of abrasive grains while rotating the substrate by using a tape polishing machine (for example, the one described in Japanese Patent Application Laid-Open No. 62-262227), a texture almost in the circumferential direction was formed on the surface of the substrate. Further, dirt adhered onto the substrate such as polishing agent or the like was washed away and dried.

On both of the faces of the substrate processed as mentioned above, the first undercoating layers made of 60 at %Co-30 at %Cr-10 at %Ta alloy each having the thickness of 20 nm, the second undercoating layers made of 85 at %Cr-20 at %Ti alloy each having the thickness of 20 nm, the magnetic film made of 72 at %Co-20 at %Cr-8 at %Pt alloy each having the thickness of 20 nm, and the carbon protective layers each having the thickness of 10 nm are sequentially formed, respectively. The same layer forming apparatus used in the embodiment 1 was used and the layers were formed in 9 seconds per tact. The argon (Ar) gas pressure at the time of layer formation was fixed to 5 mTorr. The oxygen partial pressure in the main chamber during the layer forming operation was about $1 \times 10^{-9}$ (Torr).

The first undercoating layers were deposited in the first undercoating layer forming chamber in a state where the substrate was not heated, then heated to 270° C. by a lamp heater in the heating chamber, and exposed to an atmosphere in which the pressure of mixed gas of 98% Ar-2%$O_2$ was 4 mTorr (gas flow rate of 8 sccm) for three seconds in the oxidation chamber, and the layers were sequentially deposited. This corresponds to 4 mTorr$\times 0.02 \times 3$ seconds$=2.4 \times 10^{-4}$ (Torr·sec) with respect to $PO_2 \cdot t$. After forming the carbon protective films, a lubricant obtained by diluting a perfluoroalkylpolyether material with a fluorocarbon material was applied as lubricant films.

In a layer forming apparatus in which the vacuum degree achieved is low and the oxygen partial pressure is large as compared with the layer forming apparatus used in the embodiments of the invention, or a layer forming apparatus in which time required from the formation of the first undercoating layers until the formation of the second undercoating layers is long like an apparatus which can form layers simultaneously on a plurality of substrates, it is not necessary to provide the oxidation chamber as in the embodiments, but the fine nucleation by the oxidation can be derived and effects similar to those of the foregoing embodiments can be obtained.

<Embodiment 5>

A magnetic recording medium with a film construction similar to that of the embodiment 1 was fabricated. A chemically strengthened aluminosilicate glass of the 2.5 inch type was used as the substrate. On the faces of the substrate, the first undercoating layers made of 60 at %Co-30 at %Cr-10 at %Zr alloy each having the thickness of 25 nm, the second undercoating layers made of 85 at %Cr-15 at %Ti alloy each having the thickness of 20 nm, magnetic films made of 75 at %Co-19 at %Cr-6 at %Pt alloy each having the thickness of 20 nm, and the carbon protective layers each having the thickness of 10 nm were sequentially formed. An apparatus for forming layers simultaneously on a plurality of substrates held by a pallet was used as a layer forming apparatus and layers were formed in 60 seconds per tact. The argon (Ar) gas pressure at the time of layer formation was fixed to 6 mTorr. The oxygen partial pressure in the respective chambers during the layer forming operation was about $1 \times 10^{-8}$ (Torr).

The first undercoating layers were deposited in the first undercoating layer forming chamber in a state where the substrate was not heated, then heated to 270° C. by a lamp heater in the heating chamber, and the layers were sequentially formed. This corresponds to about $2 \times 10^{-6}$ (Torr·sec) with respect to $PO_2 \cdot t$. After forming the carbon protective films, a material obtained by diluting a perfluoroalkylpolyether material with a fluorocarbon material was applied as lubricant films.

The evaluation results of the foregoing embodiments and comparison examples are as shown in Table 2.

TABLE 2

| | First undercoating layer | $PO2 \cdot t$ (Torr·sec) | $vI \cdot sb$ ($\times 10^{-15}$ emu) | Hc (Oe) | $Br \cdot t$ (G·$\mu$m) |
|---|---|---|---|---|---|
| Embodiment 1 | 60 at % Co-30 at % Cr-10 at % Zr | $1.5 \times 10^{-4}$ | 1.05 | 2170 | 88.8 |
| Comparison example 1 | 60 at % Co-30 at % Cr-10 at % Zr | $3.2 \times 10^{-7}$ | 2.24 | 1850 | 87.0 |
| Embodiment 2 | 62 at % Co-30 at % Cr-8 at % Ta | $2.4 \times 10^{-4}$ | 0.98 | 2640 | 85.3 |
| Comparison example 2 | 62 at % Co-30 at % Cr-8 at % Ta | $2.3 \times 10^{-8}$ | 1.81 | 2430 | 84.3 |
| Embodiment 3 | 85 at % Cr-15 at % Zr | $1.3 \times 10^{-4}$ | 0.89 | 2680 | 69.3 |
| Comparison example 3 | 85 at % Cr-15 at % Zr | $2.2 \times 10^{-8}$ | 1.44 | 2460 | 66.5 |
| Embodiment 4 | 60 at % Co-30 at Cr-10 at % Ta | $2.4 \times 10^{-4}$ | 0.87 | 2890 | 78.3 |
| Embodiment 5 | 60 at % Co-30 at % Cr-10 at % Zr | $2.0 \times 10^{-6}$ | 1.12 | 2090 | 87.6 |

When the magnetic films were directly formed, without the second undercoating layers, on the first undercoating layers made of a Co alloy having an amorphous structure or a fine crystal structure which is like the amorphous structure which was exposed to the oxidizing atmosphere, the magnetic films show a strong orientation (00.1). The orientation is such that the c-axis of the Co alloy crystal of the magnetic film is oriented to the vertical direction for the film plane. Although the medium cannot be used as an in-plane magnetic recording medium but is suitable to a vertical magnetic recording medium for recording the magnetization in the vertical direction for the film plane.

Figure 6A:
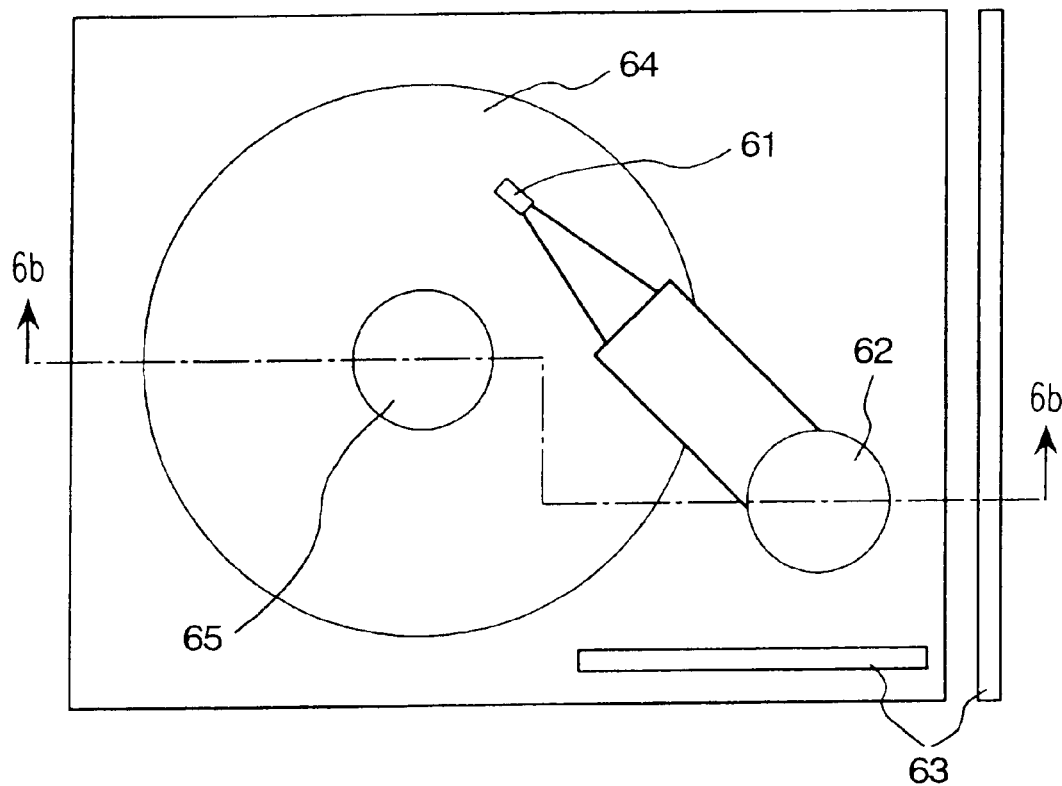
FIGS. 6a and 6b are a plan schematic diagram and a schematic cross section according to an embodiment of a magnetic storage of the invention, respectively.
Figure 6B:
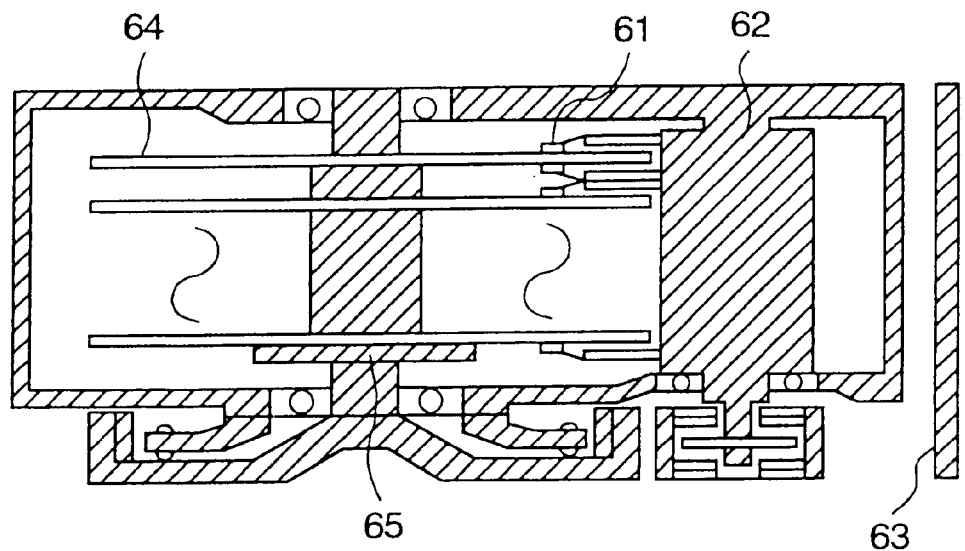

FIG. 6 is a schematic plan view of a magnetic disk apparatus according to an embodiment of the invention and a schematic cross section taken on line 6b—6b. The magnetic disk apparatus comprises: a disc drive mechanism 65 for driving a magnetic recording medium 64 in a recording direction; a magnetic head 61 which is provided so as to correspond to the faces of the magnetic recording medium 64 and consists of a recording part and a reproducing part; a magnetic head drive mechanism 62 for positioning the magnetic head 61 to a desired position; and a read and write signal processor 63 for inputting signals to the magnetic head and reproducing reproduction signals from the magnetic head. By constructing the reproducing part of the magnetic head by a MR head, sufficient signal intensity in the high recording density can be obtained, so that a very reliable magnetic disk apparatus having a recording density of 1 gigabit or higher per square inch can be realized.

When the magnetic recording medium of the invention is used in the magnetic disk apparatus, an interval between two shielding layers sandwitching the magnetic resistive sensor part of the MR head is preferably 0.35 $\mu$m or narrower. When the interval between the shielding layers is wider than 0.35 $\mu$m, the resolution deteriorates and the phase jitter of signals becomes large.

Further, the MR head is constructed by a magnetic resistive sensor including a plurality of conductive magnetic layers in which magnetization directions are relatively changed by an external magnetic field, thereby causing large resistance change and the conductive non-magnetic layers arranged between the conductive magnetic layers. By using the giant magnetic resistive effect or the spin valve effect, the signal intensity can be further raised. Consequently, a very reliable magnetic storage having a recording density of 2 gigabits or more per square inch can be realized.

The entire disclosure of Japanese Patent Application No. 8-292451 filed on Nov. 5, 1996 including specification, claims, drawings and summary are incorporated herein by reference in its entirety.

What is claimed is:

1. A method of fabricating a magnetic recording medium comprising the steps of:

forming first undercoating layers on surfaces of a substrate;

exposing the first undercoating layers to an atmosphere including oxygen for a period of time during which $PO_2 \cdot t$, $PO_2$ is oxygen partial pressure in the atmosphere and t is exposing time to the atmosphere, ranges from $1 \times 10^{-6}$ (Torr·sec) to $1 \times 10^{-2}$ (Torr·sec);

forming second undercoating layers on the first undercoating layers exposed to the atmosphere, respectively; and forming magnetic films on the second undercoating layers, respectively.

2. The method according to claim 1, wherein the first undercoating layers are made of an alloy, and the alloy includes at least two kinds of elements in which a difference of oxide formation standard free energies $\Delta G°$ of the elements is 150 (kJ/mol $O_2$) or more at the temperature of 250° C.

3. The method according to claim 1, wherein the first undercoating layers are formed directly on the substrate.

4. The method according to claim 1, wherein the first undercoating layers are formed on substrate surface undercoating layers formed on the surface of the substrate, respectively.

* * * * *